(12) United States Patent
Nagao

(10) Patent No.: US 11,786,027 B2
(45) Date of Patent: Oct. 17, 2023

(54) PRINTING APPARATUS, PRINTING METHOD AND RECORDING MEDIUM FOR RECORDING PROGRAMS TO DETERMINE A BASE COATED REGION FROM AN IMAGE OF A NAIL AND A DESIGN PRINTING REGION IN ORDER TO GENERATE PRINT DATA TO PERFORM PRINTING ON A NAIL USING A PRINT HEAD

(71) Applicant: CASIO COMPUTER CO., LTD., Tokyo (JP)

(72) Inventor: Tomoyuki Nagao, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 303 days.

(21) Appl. No.: 17/180,497

(22) Filed: Feb. 19, 2021

(65) Prior Publication Data

US 2021/0282528 A1 Sep. 16, 2021

(30) Foreign Application Priority Data

Mar. 10, 2020 (JP) .................................. 2020-040401

(51) Int. Cl.
*B41J 3/44* (2006.01)
*H04N 1/393* (2006.01)
(Continued)

(52) U.S. Cl.
CPC .............. *A45D 29/00* (2013.01); *B41J 3/407* (2013.01); *B41J 3/4073* (2013.01); *B41J 3/445* (2013.01);
(Continued)

(58) Field of Classification Search
CPC ... A45D 2029/005; A45D 29/00; B41J 3/407; B41J 3/4073; B41J 3/445; B41M 1/40; H04N 1/6097; H04N 2201/0084
(Continued)

(56) References Cited

U.S. PATENT DOCUMENTS 8,840,206 B2  9/2014 Hashimoto
9,205,672 B1 * 12/2015 Bitoh ....................... B41J 3/546
(Continued)

FOREIGN PATENT DOCUMENTS

JP  2012055467 A  3/2012
JP  2013034748 A  2/2013
(Continued)

OTHER PUBLICATIONS

Japanese Office Action dated Jun. 7, 2022 (and English translation thereof) issued in counterpart Japanese Application No. 2020-040401.
(Continued)

*Primary Examiner* — Chad Dickerson
(74) *Attorney, Agent, or Firm* — Holtz, Holtz & Volek PC

(57) ABSTRACT

A printing apparatus includes at least one processor which detects color information on a region which is not coated with base and a base coated region which is coated with the base from an image of a nail, sets, in a relation between the base coated region and a desired design, a region which overlaps with the design in the base coated region as a design printing region in which the design is to be printed, sets a region which does not overlap with the design printing region in the base coated region as a nail color coating region which is to be coated with a nail color which is based on color information on the nail and thereby generates print data and a print head which performs printing on the nail in accordance with the print data.

7 Claims, 7 Drawing Sheets

(51) Int. Cl.
*A45D 29/00* (2006.01)
*B41J 3/407* (2006.01)
*B41M 1/40* (2006.01)
*H04N 1/60* (2006.01)

(52) U.S. Cl.
CPC .............. *B41M 1/40* (2013.01); *H04N 1/393* (2013.01); *H04N 1/6097* (2013.01); *A45D 2029/005* (2013.01); *H04N 2201/0084* (2013.01)

(58) Field of Classification Search
USPC ............ 358/1.8, 1.11–1.18; 132/73.5; 347/3
See application file for complete search history.

(56) References Cited

U.S. PATENT DOCUMENTS

| | | | | |
|---|---|---|---|---|
| 2013/0038647 | A1* | 2/2013 | Hashimoto | .............. B41J 29/02 347/2 |
| 2015/0062216 | A1* | 3/2015 | Yamasaki | .............. B41J 3/4073 347/9 |
| 2015/0375526 | A1* | 12/2015 | Yamasaki | ................ B41J 3/407 347/9 |

FOREIGN PATENT DOCUMENTS

| | | | |
|---|---|---|---|
| JP | 2014171699 A | * | 9/2014 |
| JP | 2014171699 A | | 9/2014 |

OTHER PUBLICATIONS

Japanese Office Action (and an English translation thereof) dated Sep. 6, 2022, issued in counterpart Japanese Application No. 2020-040401.

* cited by examiner

PRINTING APPARATUS, PRINTING METHOD AND RECORDING MEDIUM FOR RECORDING PROGRAMS TO DETERMINE A BASE COATED REGION FROM AN IMAGE OF A NAIL AND A DESIGN PRINTING REGION IN ORDER TO GENERATE PRINT DATA TO PERFORM PRINTING ON A NAIL USING A PRINT HEAD

1. TECHNICAL FIELD

The present disclosure relates to a printing apparatus, a printing method and a recording medium for recording programs.

2. DESCRIPTION OF THE RELATED ART

Now, a printing apparatus (a nail printing apparatus) which prints a nail design on a fingernail and so forth is known.

In such a printing apparatus as described above, it is necessary to appropriately specify a position where the design is to be printed and a range over which the design is to be printed.

In this regard, for example, in order to specify a nail region which is to be set as a printing object, a technique for setting characteristic points on an image of a nail along a contour line of the nail region, creating a model for nail region extraction which is made to correspond to coordinate information, fitting the model for nail region extraction in the nail region which is specified as the printing object and thereby specifying the position where the design is to be printed and the range over which the design is to be printed is known (see, for example, Japanese Patent Application Laid-Open No. 2012-55467).

However, creation of the model for nail region extraction by setting the characteristic points is complicated and takes much time and labor.

Accordingly, it is conceived to coat a region in which it is wished to print the design with base of a color which is clearly distinguishable from colors of the nail and a skin such as white and so forth and to print the design in the region which is coated with the base.

In this case, it is possible to automatically and highly accurately specify a print range by, for example, photographing the nail which is coated with the base by a camera and so forth and performing image processing and so forth on a captured image.

In addition, since fixability of ink when printing the design is improved and, in addition, it becomes possible to vividly develop the original color of the ink by coating the nail with the base, it becomes possible to realize beautifully finished nail printing.

SUMMARY OF THE INVENTION

According to one aspect of the present invention, there is provided a printing apparatus including at least one processor which detects color information on a region which is not coated with base and a base coated region which is coated with the base from an image of a nail, sets a region which overlaps with a design which is to be printed on the nail in the base coated region as a design printing region in which the design is to be printed, sets a region which does not overlap with the design printing region in the base coated region as a nail color coating region which is to be coated with a nail color which is based on color information on the nail and thereby generates print data, and a print head which performs printing on the nail in accordance with the print data.

DETAILED DESCRIPTION OF THE PREFERRED EMBODIMENTS

A printing apparatus, a printing method and a program according to one embodiment of the present disclosure will be described.

Incidentally, although various limitations which are technically preferable for embodying the present disclosure are set on the embodiment which will be described in the following, these limitations do not limit the scope of the present disclosure to the following embodiment and illustrated examples.

In addition, although, in the following embodiment, a description will be made by exemplifying a nail printing apparatus which performs printing on a fingernail which is a printing object as the printing apparatus, the printing object of the printing apparatus according to the present invention is not limited to the fingernail and, for example, a toenail and so forth may be set as the printing object. In addition, nail-shaped objects other than the nail of a person such as nail chips and surfaces of various accessories and so forth may be set as the printing objects.

Figure 1:
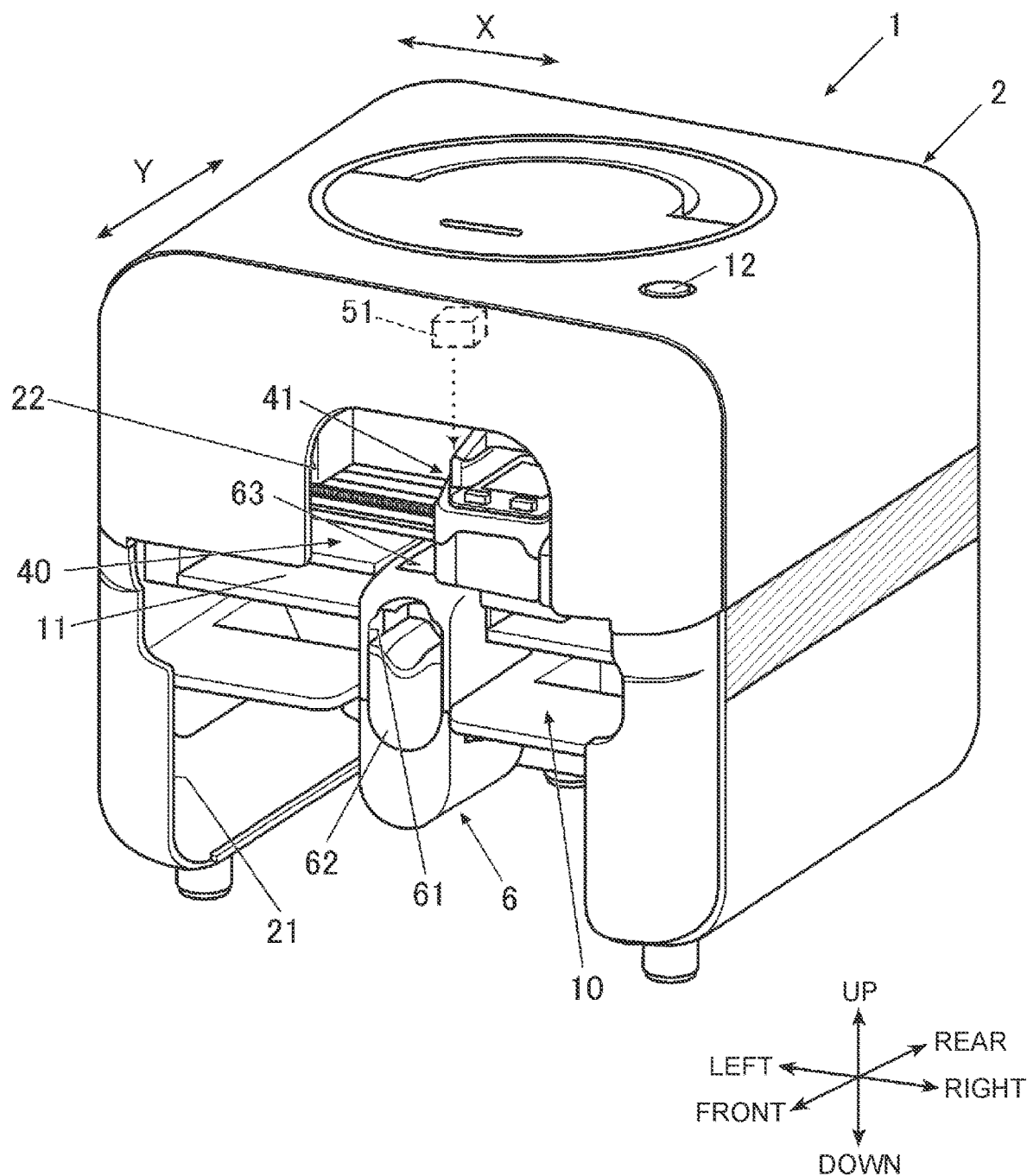
FIG. 1 is a perspective view illustrating one example of a configuration of essential parts of a printing apparatus according to one embodiment of the present invention.

FIG. 1 is a perspective view illustrating one example of an external configuration of essential parts of a printing apparatus 1 according to one embodiment of the present disclosure.

Incidentally, in the following embodiment, it is supposed that "up/down", "left/right" and "front/rear" denote orientations which are illustrated in FIG. 1. In addition, it is supposed that an X direction and a Y direction denote directions which are illustrated in FIG. 1.

As illustrated in FIG. 1, the printing apparatus 1 includes a housing 2 which is formed into an almost box-like shape.

The housing 2 has an opening 21 which is formed in a lower-side part on the front side (the front-face side of the printing apparatus 1, that is, the front side in FIG. 1) over the almost entire surface in a left-right direction (a lateral direction of the printing apparatus 1, the left-right direction, that is, the X direction in FIG. 1). In addition, a notch 22 is formed in a left-right-direction almost central part of the housing 2 in a state of being continuous to the upper side of the opening 21. The notch 22 functions as an inlet/outlet which is used in a case where a print head 41 which will be described later is attached to/detached from the printing apparatus 1.

Incidentally, although not illustrated in FIG. 1, the housing 2 may include a cover member and so forth which cover the opening 21 and the notch 22. The cover member may be formed as another member which is formed separately from the housing 2 or may be attached to the housing 2 to be openable/closable via, for example, a hinge and so forth.

In addition, an operation unit 12 of the printing apparatus 1 is installed on an upper face (a top plate) of the housing 2. The operation unit 12 is, for example, an operation button (a power source switch button) which turns a power source of the printing apparatus 1 ON/OFF. In a case where the operation unit 12 is operated, an operation signal is output to a control device 30 and the control device 30 performs control which follows the operation signal and thereby operates respective units of the printing apparatus 1. For example, in a case where the operation unit 12 is the power source switch button, the power source of the printing apparatus 1 is turned ON/OFF in accordance with operation of the switch button.

Incidentally, the respective units of the printing apparatus 1 may be operated in accordance with an operation signal which is input from an operation unit 71 of a terminal apparatus 7 which will be described later, in place of use of the operation unit 12.

Shapes, arrangements and so forth of respective units of the housing 2 are not limited to those in an example which is illustrated in FIG. 1 and are appropriately settable. For example, the operation unit 12 may be installed on a side face, a rear face or the like, not on the upper face of the housing 2. In addition, various other operation buttons may be installed on the housing 2 as the operation unit 12 and various display units, indicators and so forth may be also installed on the housing 2.

An apparatus main body 10 is housed in the housing 2.

The apparatus main body 10 includes a base 11, a finger placement unit 6 which is attached to the base 11, a print device and so forth.

The finger placement unit 6 is attached to a left-right-direction (X-direction) almost central part of the base 11 on the front-face side of the printing apparatus 1 and is adapted to hold a finger U with a nail T which is the printing object in the present embodiment in a region which is suited for printing.

The finger placement unit 6 has an opening 61 on the front-face side of the printing apparatus 1. In addition, a finger fixing member 62 is installed in the finger placement unit 6. The finger fixing member 62 is adapted to support the finger U which is inserted through the opening 61 by pushing the finger U upward from the lower side and is made of, for example, flexible resin and so forth.

A window 63 through which a part of the nail T of the finger U which is inserted through the opening 61 and is held by the finger fixing member 62 is exposed is formed in an upper face of the finger placement unit 6.

The print device 40 is adapted to perform printing on the nail T which is the printing object in accordance with print data which is generated by a print data generation unit 314 (see FIG. 2) which will be described later.

The print device 40 includes the print head 41 which performs a printing operation and a head movement mechanism 49 which is adapted to move the print head 41.

In the present embodiment, the print head 41 is an ink jet head of an ink jet system that a face which faces a nail surface is in the form of an ink ejection surface (not illustrated) which is equipped with a plurality of nozzle holes (not illustrated) which eject ink and printing is performed by making the ink into extremely fine droplets and spraying the ink from the ink ejection surface directly onto the nail surface which is a printed face of the printing object (the nail T). Although there is no particular limitation on a configuration of the print head 41, the print head 41 is, for example, a cartridge-integrated type head that an ejection mechanism unit (not illustrated) such as the ink ejection face and so forth is integrated with an ink cartridge (not illustrated).

The print head 41 is configured to make it possible to eject inks of, for example, yellow (Y: YELLOW), magenta (M: MAGENTA) and cyan (C: CYAN). Incidentally, the kinds of the inks which are included in the print head 41 are not limited to the yellow, magenta and cyan inks. In the present embodiment, the print head 41 is configured to make it possible to express skin color (nail color) which is close to the color of the nail T and so forth.

The head movement mechanism 49 is configured by an X-direction movement mechanism (not illustrated) which is adapted to move the print head 41 in the left-right direction (the X direction) of the printing apparatus 1 and a Y-direction movement mechanism (not illustrated) which is adapted to move the print head 41 in a front-rear direction (the Y direction) of the printing apparatus 1.

The X-direction movement mechanism includes an X-direction movement motor 46 and the X-direction movement motor 46 is driven to move the print head 41 in the left-right direction (the X direction) of the printing apparatus 1. In addition, the Y-direction movement mechanism includes a Y-direction movement motor 48 and the Y-direction movement motor 48 is driven to move the print head 41 in the front-rear direction (the Y direction) of the printing apparatus 1.

Operations of the X-direction movement motor 46, the Y-direction movement motor 48 and the print head 41 (an ejection mechanism unit of the print head 41) of the head movement mechanism. 49 are controlled by a print control section 315 (see FIG. 2) of a control unit 31 of the control device 30.

In addition, a photograph device 50 which photographs the nail T (the finger U which includes the nail T) which is exposed through the window 63 and captures an image of the nail T (an image of the finger U which includes the nail T, in the following, referred to as a "nail image") is installed on the inner side of the upper face (the top plate) of the housing 2 and above the window 63 in the finger placement unit 6.

Figure 2:
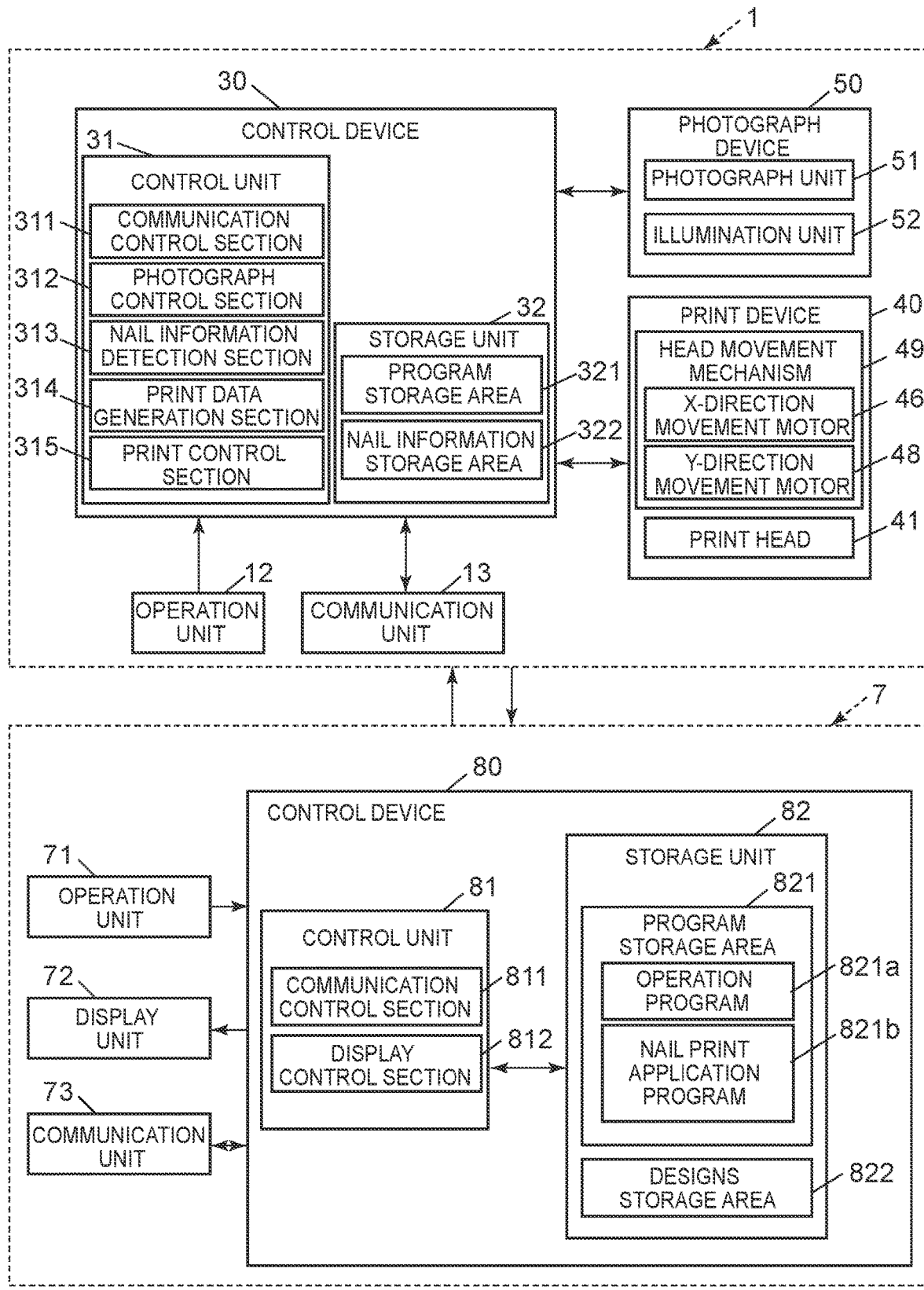
FIG. 2 is an essential part block diagram illustrating one example of control configurations of the printing apparatus and a terminal apparatus which operates in cooperation with the printing apparatus.

The photograph device 50 includes a photograph unit 51 such as, for example, a camera and so forth and an illumination unit 52 which is configured by a white LED and so forth which illuminate the nail T which is a photographic object (see FIG. 2). Incidentally, as will be described later, in the present embodiment, the photograph device 50 is configured to acquire color information on the nail T from the image of the nail T. Accordingly, it is preferable for the photograph unit 51 to have a performance (a resolution and so forth) of such an extent that it is possible to discriminate between colors from the photographed image.

The photograph device 50 is connected to a photograph control unit 312 (see FIG. 2) of the control device 30 which will be described later so as to be controlled by the photograph control unit 312.

The nail image which is photographed by the photograph unit 51 is acquired by the photograph control unit 312.

Incidentally, image data on the image which is photographed by the photograph device 50 may be stored into a storage unit 32 which will be described later.

In the present embodiment, a case where the photograph device 50 (the photograph unit 51 and the illumination unit 52) is fixedly disposed on the inner side of the upper face of the housing 2 and at a position where it is possible for the photograph device 50 to face the nail T (the surface of the nail T) of the finger U which is placed on the finger placement unit 6 is exemplified. However, it is sufficient that the photograph device 50 be installed at a position where it is possible to photograph the nail T of the finger U which is placed on the finger placement unit 6 and there is no particular limitation on the concrete arrangement of the photograph device 50.

For example, the photograph device 50 may be configured to be movable in the X and Y directions by the head movement mechanism 49 which moves the print head 41.

The control device 30 is loaded on, for example, a substrate (not illustrated) or the like which is disposed on the inner side (the lower-face side) of the upper face (the top plate) of the housing 2.

FIG. 2 is an essential part block diagram illustrating one example of control configurations of the printing apparatus 1 and a terminal apparatus which operates in cooperation with the printing apparatus 1 according to the present embodiment.

As illustrated in FIG. 2, the control device 30 is a computer which includes a control unit 31 which is configured by a processor such as a CPU (Central Processing Unit (not illustrated)) and so forth and the storage unit 32 which is configured by a ROM (Read Only Memory (not illustrated)), a RAM (Random Access Memory (not illustrated)) and so forth.

The storage unit 32 includes a program storage area 321 in which various programs and so forth which are used for operating the printing apparatus 1 are stored, a nail information storage area 322 in which the nail information is stored and so forth.

Specifically, the various programs such as a printing program and so forth used for performing the print processing are stored in the storage unit 32, the control unit 31 expands these programs in, for example, work areas of the RAM so as to execute the programs by the control unit 31 and thereby the respective units of the printing apparatus 1 are integrally controlled.

In addition, data on the nail image and so forth which are captured by the photograph device 50 may be stored in the storage unit 32.

The control unit 31 includes a communication control section 311, the photograph control section 312, a nail information detection section 313, the print data generation section 314, the print control section 315 and so forth when viewing from a functional aspect. Functions of the control unit 31 as the communication control section 311, the photograph control section 312, the nail information detection section 313, the print data generation section 314, the print control section 315 and so forth are realized by cooperation of the control unit 31 with the programs which are stored in the program storage area 321 of the storage unit 32.

The communication control section 311 is adapted to control an operation of a communication unit 13.

The communication unit 13 includes a wireless communication module and so forth which make communication between the communication unit 13 and a communication unit 73 of the terminal apparatus 7 possible and the communication control section 311 controls the operation of the communication unit 13 in a case where various kinds of data and so forth are transmitted and received between the printing apparatus 1 and the terminal apparatus 7.

The printing apparatus 1 according to the present embodiment is configured to perform printing of a nail design (in the following, also simply referred to as a "design D") in cooperation with the terminal apparatus 7 which will be described later. For example, data on the design D to be printed on the nail T is stored on the terminal apparatus 7 side and the communication control section 311 appropriately controls communication which is performed by the communication unit 13 and acquires the data on the design D from the terminal apparatus 7 side via the communication unit 13.

In addition, in the present embodiment, in a case where a matter for which it is wished to make an inquiry to a user and to seek confirmation, a decision and so forth from the user arises on the printing apparatus 1 side, the matter may be transmitted to the terminal apparatus 7 side.

Communication between the printing apparatus 1 and the terminal apparatus 7 may be established by using a network line such as the Internet and so forth and may be also established in the form of wireless communication which is based on near field wireless communication standards such as, for example, Bluetooth (registered trade mark), Wi-Fi and so forth. In a case where the communication is established over the network, any circuit may be utilized as the network to be used for the communication. In addition, the communication between the printing apparatus 1 and the terminal apparatus 7 is not limited to the wireless communication and the printing apparatus 1 and the terminal apparatus 7 may be configured to allow transmission and reception of various kinds of data by wired connection between the printing apparatus 1 and the terminal apparatus 7.

Incidentally, any type of the communication unit 13 may be used as long as the communication unit 13 makes it possible to establish the communication between the printing apparatus 1 and the terminal apparatus 7 and the communication unit 13 whose communication standard matches the communication standard of the communication unit 73 of the terminal apparatus 7 is applied.

The photograph control section 312 controls operations of the photograph unit 51 and the illumination unit 52 of the photograph device 50 and makes the photograph unit 51 photograph the image (the nail image) of the finger U which includes the image of the nail T of the finger U which is placed on the finger placement unit 6.

In the present embodiment, as will be described later, the photograph device 50 is configured to photograph the nail T which is in a state of being coated with the base and the image (the nail image) of the nail T which is captured by the photograph device 50 is sent to the photograph control section 312. The photograph control section 312 functions as an image capturing section which captures such a nail image (data on the image of the nail T) as above. Incidentally, the photograph control section 312 may make the storage unit 32 store the nail image.

The nail information detection section 313 is a control section which detects nail information on the nail T of the finger U on the basis of the image (the nail image) of the nail T.

In the present embodiment, the nail information detection section 313 detects color information on the nail T and a position, a range and so forth of a base coated region WAr (see FIG. 4A) which is coated with the base in a region of the nail T from the nail image as the nail information. Incidentally, although that the nail T is coated with what kind of material as the base is appropriately set, it is preferable that the material be a liquid material of a color which is distinguished from colors of the nail T and the skin with ease and which does not avoid color development (or promotes color development) of a color of ink with which printing is performed by the print unit 40 such as, for example, white and so forth.

Information on the position, the range and so forth of the base coated region WAr is detected by seeing, for example, a difference in color between the base coated region and regions other than the base coated region (a brightness difference, a luminance difference and so forth are included) and so forth.

As the color information on the nail T, information on the entire region of the nail T may be acquired and information on regions and so forth which are adjacent to the base coated region WAr may be acquired. It is preferable that in the detected color information, color information on each pixel in the region of the nail T be set in correspondence with position information on each pixel (for example, position coordinates and so forth of each pixel).

The color information on the nail T and the information on the position, the range and so forth of the base coated region WAr which are acquired by the nail information detection section 313 are stored into the nail information storage area 322 of the storage unit 32.

Incidentally, the nail information which is detected by the nail information detection section 313 is not limited to the above-mentioned nail information.

In the present embodiment, the nail information which is detected by the nail information detection section 313 includes a contour (a nail shape, XY coordinates of a horizontal position of the nail T and so forth) of the entire nail T. In addition, the nail information may also include, for example, an inclination angle of a surface of the nail T relative to an XY plane (the inclination angle of the nail T, a curvature of the nail T) and so forth. In addition, in a case where it is possible to acquire a height of the nail T (a vertical-direction position of the nail T) from the image and so forth which are photographed by the photograph unit 51, also the height of the nail T may be included in the nail information.

The print data generation section 314 is a control section which generates the print data with reference to the color information on the nail T and the information on the position, the range and so forth of the base coated region WAr which are detected by the nail information detection section 313.

Specifically, the print data generation section 314 segments the image data on the nail design (the design D) which is selected by the user, appropriately performs scaling-up/down and so forth on the image data and sets a region in which it is possible to print the desired design D without being spoiled in a relation with the base coated region WAr (the position, the range and so forth of the base coated region WAr) which is detected from the image of the nail T as a "design printing region WAr1" (see FIG. 5C and so forth) in which the design D is to be printed. Incidentally, a concrete method of defining the "region in which it is possible to print the desired design D without being spoiled in the relation with the base coated region WAr" will be described later.

In addition, in the base coated region WAr, a region which does not overlap with the design printing region is set as a "nail color coating region WAr2" (see FIG. 5C and so forth) which is to be coated with a color which is based on the color information on the nail T (the color which is closest to the color of the nail T, hereinafter, referred to as a "skin color"). Then, the print data is generated in such a manner that the design D is printed in the "design printing region WAr1" and the "nail color coating region WAr2" is coated with the "skin color".

Incidentally, in a case where the curvature and so forth of the nail T are acquired by the nail information detection section 313, the print data generation section 314 may appropriately perform curvature correction on the print data on the basis of the curvature and so forth of the nail T. In a case where the curvature correction is performed on the print data, it becomes possible to generate the print data which is more similar to the shape of the nail T.

It is preferable that the "skin color" be set on the basis of the color information on the nail T in a region which is located in the vicinity of the base coated region WAr, in particular, in the vicinity of the "nail color coating region WAr2". Incidentally, it is possible to appropriately select a way of setting the "nail color" on the basis of the nail information on the nail T. For example, an average value of the color information in a predetermined region which is located in the vicinity of the "nail color coating region WAr2" may be set as the "nail color" and an average value of the color information on the entire region of the nail T may be set as the "nail color".

In addition, the "nail color" is not limited to the one which is decided on the basis of analysis and so forth of the color information on the nail T from the nail image. For example, before the nail T is coated with the base, the nail T may be photographed and a nail image of the nail T which is photographed may be saved, an image in a region which corresponds to the "nail color coating region WAr2" may be segmented from the nail image, and thereby the image may be used as image data to be printed in the "nail color coating region WAr2".

In this case, the print data generation section 314 generates the print data in such a manner that the design D is printed in the "design printing region WAr1" and the image which is segmented from the region which corresponds to the "nail color coating region WAr2" is printed in the "nail color coating region WAr2".

The print control section 315 controls the print unit so as to perform printing on the nail T in accordance with the print data which is generated by the print data generation section 314.

Specifically, the print control section 315 outputs a control signal to the print unit 40 on the basis of the print data and controls operations of the X-direction movement motor 46, the Y-direction movement motor 48, the print head 41 and so forth of the print unit 40 so as to perform printing which is based on this print data on the nail T.

In addition, as described above, the printing apparatus 1 according to the present embodiment performs printing on the nail T in cooperation with the terminal apparatus 7.

The terminal apparatus 7 is a portable terminal apparatus such as, for example, a smartphone and so forth. Incidentally, the terminal apparatus 7 is not limited to the smartphone. The terminal apparatus 7 may be, for example, a tablet type personal computer (in the following, referred to as a "PC"), a laptop PC, a desktop PC, a terminal apparatus for games and so forth.

As illustrated in FIG. 2, the terminal apparatus 7 includes the operation unit 71, a display unit 72, the communication unit 73, a control device 80 and so forth.

The operation unit 71 is a touch panel which is configured to make it possible to perform various inputting and setting operations and so forth in accordance with an operation of the user and is integrally disposed on a surface of, for example, the display unit 72. In a case where the operation unit 71 is operated, an input signal which corresponds to the operation is transmitted to the control unit 81.

Various operation screens are displayed on the touch panel which is integrally disposed on the surface of the display unit 72 in accordance with control of a display control section 812 which will be described later and thereby it becomes possible for the user to perform various operations such as the inputting and setting operations and so forth by touching the touch panel.

Incidentally, the operation unit 71 which performs the various operations such as the inputting and setting operations and so forth is not limited to the touch panel. For example, various operation buttons, a keyboard, a pointing device and so forth may be installed as the operation unit 71.

In the present embodiment, the terminal apparatus 7 is configured such that the user operates the operation unit 71 and thereby various instructions such as an instruction to start printing and so forth are output from the terminal apparatus 7 to the printing apparatus 1 and, in this regard, the terminal apparatus 7 also functions as an operation unit of the printing apparatus 1.

In addition, the terminal operation 7 is also configured such that the user operates the operation unit 71 and thereby selection and so forth of one nail design (one design D) to be printed on the nail T become possible for the user.

The display unit 72 is configured by a flat display and so forth such as, for example, a liquid crystal display (LCD), an organic electroluminescence display and others.

Incidentally, as described above, the touch panel which is adapted to perform various inputting operations may be integrally disposed on the surface of the display unit 72. In this case, the touch panel functions as the operation unit 71.

In the present embodiment, it is possible to display one nail design that the user inputs and selects via the operation unit 71 and various guide screens, warning display screens and so forth on the display unit 72.

In addition, in the present embodiment, the display unit 72 also functions as a notification unit which notifies the user of operating conditions of the respective units of the printing apparatus 1.

For example, confirmation and so forth of printing which is to be performed in accordance with the print data which is generated by the control device 30 (in particular, the print data generation section 314) of the printing apparatus 1 may be sought to the user before printing and, in this case, that printing is to be performed is notified from the printing apparatus 1 to the terminal apparatus 7 side. In this case, it is preferable for the terminal apparatus 7 which receives the notification to display a predictive image at completion and so forth which would be printed in a case of performing printing on the nail T in accordance with the print data on the display unit 72 which functions as a notification unit so as to inquire whether the printing is to be performed in this way, whether some modifications are to be made and so forth. Thereby, it becomes possible to call a user's attention before the printing is actually performed and thereby it becomes possible to avoid execution of printing of a design which is different from the design that the user imagines.

The communication unit 73 is configured so as to be communicable with the communication unit 13 of the printing apparatus 1.

The communication between the printing apparatus 1 and the terminal apparatus 7 may be established by either the wireless connection system or the wired connection system as described above and no concrete system is limitedly set. Any communication unit may be used as the communication unit 73 as long as the communication unit is of the type of making the communication with the printing apparatus 1 possible and a communication unit whose communication standard matches the communication standard of the communication unit 13 of the printing apparatus 1 is applied to the communication unit 73.

The communication unit 13 is connected to a communication control section 811 (see FIG. 2) of a control unit 81 of the control device 80 which will be described later and is controlled by the communication control section 811.

In the present embodiment, as illustrated in FIG. 2, the control device 80 of the terminal apparatus 7 is a computer which includes the control unit 81 which is configured by a processor such as a CPU (not illustrated) and so forth and the storage unit 82 which is configured by a ROM (not illustrated), a RAM (not illustrated) and so forth similarly to the control device 30.

Various programs, various kinds of data and so forth which are used to operate the respective units of the terminal apparatus 7 are stored in the storage unit 82.

Specifically, in the present embodiment, the various programs such as an operation program 821*a* which is used to integrally control the operations of the respective units of the terminal apparatus 7 and, in addition, a nail print application program 821*b* (hereinafter, referred to as a "nail print AP") which is used to perform nail printing using the printing apparatus 1 and so forth are stored in the ROM and so forth of the control unit 82, and the control unit 81 expands these programs in, for example, work areas of the RAM, the programs are executed by the control unit 81 and thereby the operations of the respective units of the terminal apparatus 7 are integrally controlled.

In addition, in the present embodiment, a design storage area 822 and so forth which store data on the nail designs (the designs D) are included in the storage unit 82.

Incidentally, the nail designs (the designs D) which are stored into the design storage area 822 may be existing designs which are prepared in advance and may be designs that the user creates by himself/herself. In addition, in a case where the terminal apparatus 7 is configured to be connectable to various networks, fetching of the nail designs (the designs D) which are stored in a network-connectable server apparatus and so forth (not illustrated) may be made possible.

The control unit 81 of the terminal apparatus 7 includes the communication control section 811, the display control section 812 and so forth when viewing from a functional aspect. Functions that the control unit 81 of the terminal apparatus 7 has as the communication control section 811, the display control section 812 and so forth are realized by cooperation of the CPU of the control unit 81 with the programs which are stored in the ROM of the storage unit 82. Incidentally, the functions that the control unit 81 of the terminal apparatus 7 has are not limited to the above-mentioned functions and the control unit 81 may include other various functional sections.

The communication control section 811 is adapted to control the operation of the communication unit 73.

In addition, the display control section 812 controls the operation of the display unit 72 so as to display various display screens on the display unit 72.

Next, a printing method in the present embodiment will be described.

In a case where nail printing is performed by using the printing apparatus 1 according to the present embodiment, the user activates the printing apparatus 1 by operating the operation unit 12 (an operation button) and so forth of the printing apparatus 1 and turning on a power source of the printing apparatus 1.

In addition, the user also turns on a power source of the terminal apparatus 7 and selects execution of nail print processing via the operation unit 71 of the terminal apparatus 7. Thereby, a nail print AP 821b is launched.

In a case where the nail print AP 821b is launched, the display control section 812 of the terminal apparatus 7 controls the display unit 72 so as to display a design selection screen which includes a list of the nail designs (the designs D), a message for encouraging the user to select one desired design and so forth. The user selects one nail design (one design D) to be printed on the nail T by operating the operation unit 71 such as the touch panel and so forth.

On this occasion, the display control section 812 may control the display unit 72 so as to display an image that the nail design that the user selects is superimposed on a picture and an illustration of the nail T in such a manner that it becomes possible for the user to confirm to see whether printing of the nail design that the user selects is finished as the user imagines before actual printing of the nail design is started. In a case where the user does not like the nail design which is displayed in this way, it may become also possible for the user to select another nail design (another design D) to be printed. In a case where the user performs an operation of deciding the nail design (the design D) to be printed, an operation signal is sent to the control device 80 and one nail design (one design D) that the user desires is selected as the design to be printed on the nail T and information on the selected nail design is sent to the printing apparatus 1 side.

Figure 3:
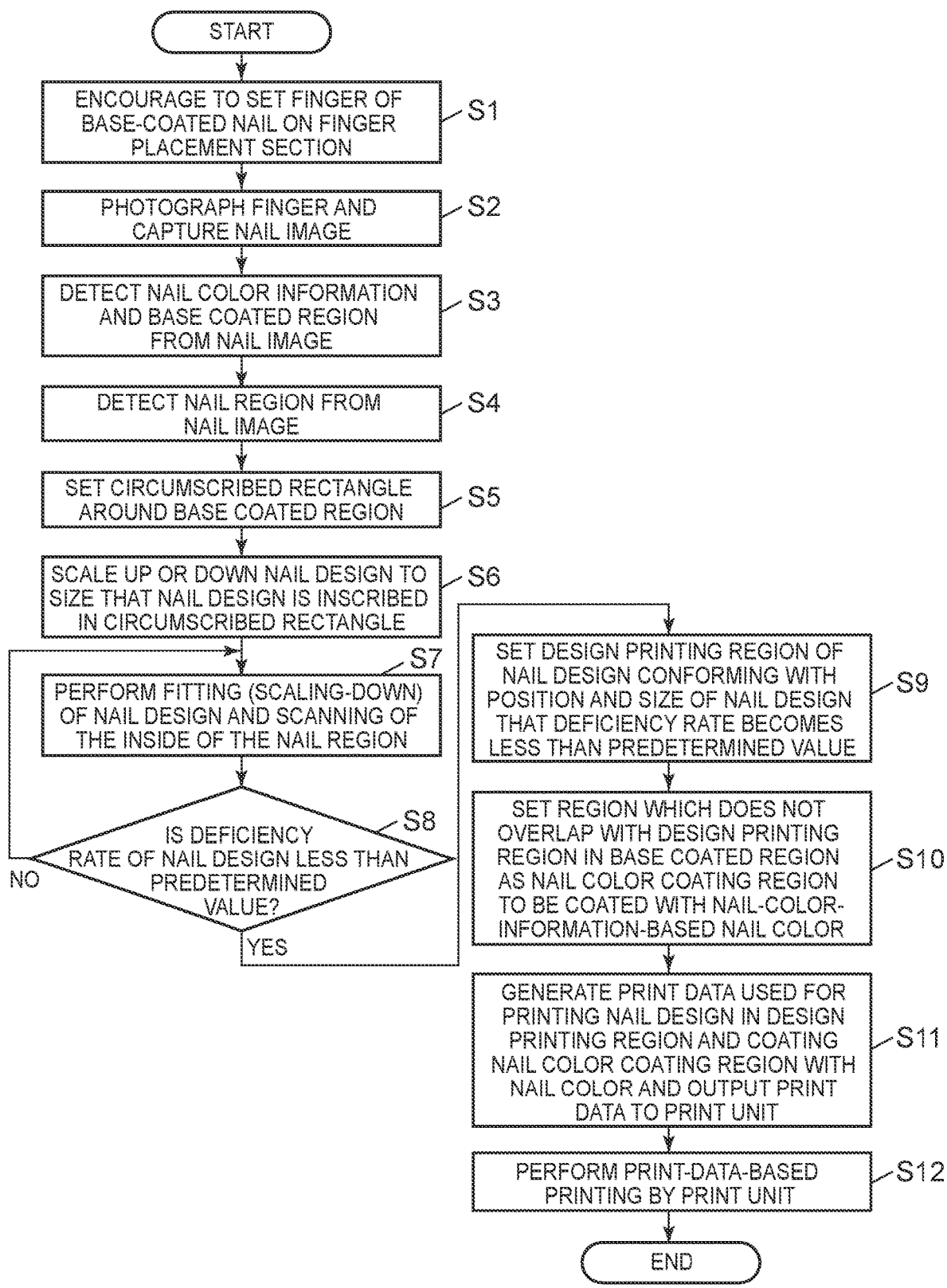
FIG. 3 is a flowchart illustrating one example of print processing.

Next, as illustrated in FIG. 3, the display control section 812 of the terminal apparatus 7 encourages the user to coat the nail T on which the user wishes to print the nail design with the base and to set the finger U of the nail T which is in a base-coated state on the finger placement unit 6 (step S1). Specifically, the display control section 812 controls the display unit 72 so as to display an instruction screen for encouraging the user to set the finger U on the finger placement unit 6.

Incidentally, on this occasion, a screen for indicating the region to be coated with the base may be displayed on the display unit 72 by superimposing the selected nail design (the design D) on the picture and the illustration of the nail T and/or by taking other measures. Thereby, it becomes easy for the user to understand which region of the nail T is to be coated with the base over how much range of the nail T in order to print the desired design D. In addition, in a case where the selected nail design (the design D) is of the type of being printed onto the entire nail, it is instructed to the user so as to coat the entire nail with the base.

In a case where the user coats the region of the surface of the nail T in which the design D is to be printed with the predetermined base of the color such as white and so forth and places the finger U which is in a state where the nail T is coated with the base on the finger placement unit 6, the finger U is photographed by the photograph device 50 of the printing apparatus 1 and the nail image is captured by the photograph control section 312 (step S2).

Then, image processing and so forth are performed on the nail image which is captured by the photograph device 50 and thereby the nail information detection section 313 detects the color information on the nail T and the base coated region WAr from the nail image (step S3). In the present embodiment, since the base coated region WAr is coated with the base of the color such as white and so forth which are distinguished from the colors of the nail T and the skin with ease as described above, it becomes possible for the nail information detection section 313 to detect the base coated region WAr comparatively with ease.

In addition, in the present embodiment, the nail information detection section 313 detects also the nail region (that is, the region of the entire nail T, coordinates and so forth of the contour shape of the nail T) as the nail information (step S4). There is no particular limitation on the way that the nail information detection section 313 detects the nail region. It is possible to use various ways such as, for example, a way of defining a boundary between the nail T and other parts by identifying a brightness difference, a luminance difference, a slight color difference and so forth between the nail T and the skin of the finger which surrounds the nail T and other ways.

In a case where various nail information on the base coated region WAr and so forth is detected by the nail information detection section 313, the print data generation section 314 generates the print data which is used for printing the design D which is selected by the user on the basis of the detected nail information.

Figure 4A:
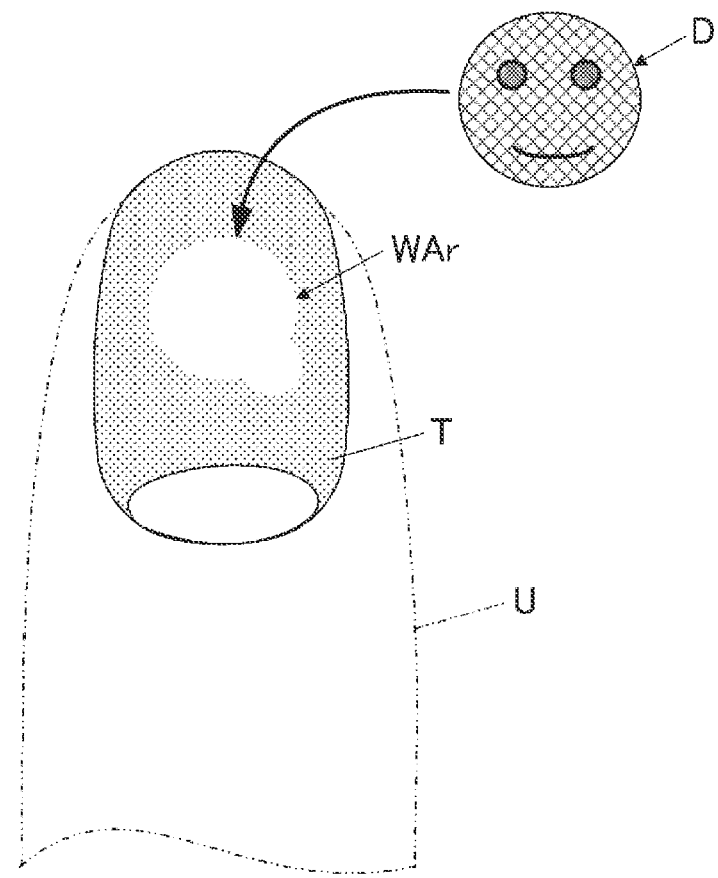
FIG. 4A is a diagram schematically illustrating one example of a state where one design is about to be fitted into one region which is coated with base of a nail.

In this respect, as illustrated in FIG. 4A, in a case where there exist coating errors such as bulging-out of the base, leaving uncoated with the base, dripping of the base and so forth in the base coated region WAr, there are cases where the design D and the base coated region WAr do not match each other in range and so forth. For example, in FIG. 4A, the bulging-out of the base is observed on a lower right part of the base coated region WAr relative to the almost circular design D and therefore the design D and the base coated region WAr do not match each other in range and shape.

Figure 4B:
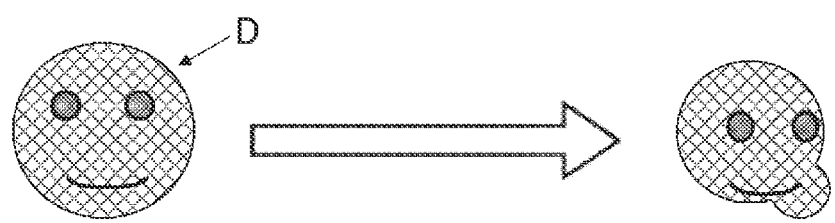
FIG. 4B is a diagram schematically illustrating one example of a case where the design is fitted into the base coated region by an existing technique.

In the above-mentioned situation, in a case where the print data which is used for printing the design D is generated in a state where the design D is forcibly fitted into the base coated region WAr, mask processing is performed by misunderstanding that a part other than the detected base coated region WAr is not a region in which the design D is to be printed and/or the shape of the base coated region WAr is ignored, there generates a portion which is low in ink fixability and color developability on a part on which the design D is printed in a distorted state, the design D is not partially printed and/or the design D is printed in a state of being left uncoated with the base and so forth as illustrated in FIG. 4B and therefore it becomes impossible for the user to print the design that the user imagines.

Accordingly, in the present embodiment, the print data generation section 314 sets a region in which printing of the desired design D is possible without being spoiled in the relation with the base coated region WAr as the design printing region WAr1 in which the design D is to be printed.

Figure 5A:
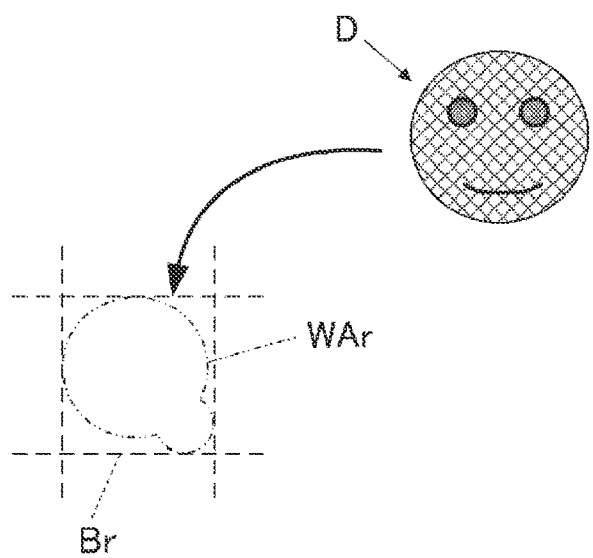
FIG. 5A is a diagram illustrating one example of a state where the design is about to be fitted into a circumscribed rectangle which is set around the base coated region.
Figure 5C:
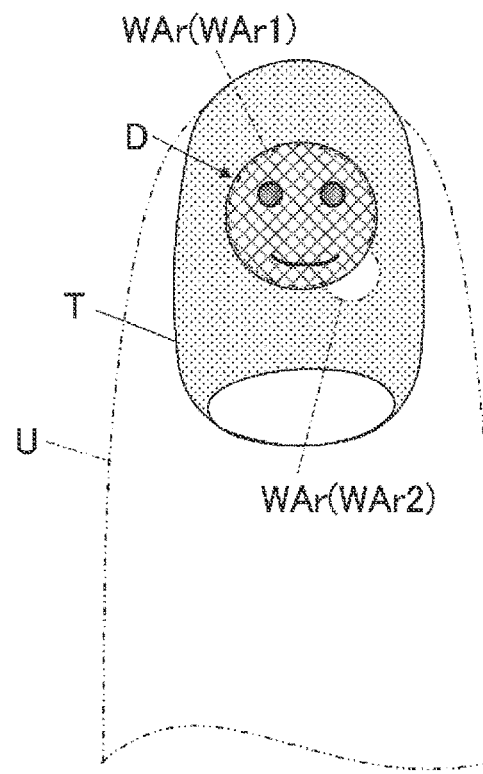
FIG. 5C is a diagram illustrating one example of a state where the design fitting and scanning are being performed.

Specifically, first, as illustrated in FIG. 5A, a circumscribed rectangle Br which is a rectangular frame which is circumscribed to the base coated region WAr is set (step S5). Then, the nail design (the design D) is scaled up/down to the size with which the design D is inscribed in the circumscribed rectangle Br and is then arranged in the circumscribed rectangle Br (step S6). In this case, an aspect ratio of the design D may be either fixed or variable. However, in a case where the aspect ratio of the design D is greatly changed in order to inscribe the design D in the circumscribed rectangle Br, there is a fear that the impression of the design D may be greatly changed depending on the kinds of the shape and a pattern of the design D which is used. For this reason, it is preferable to maintain the aspect ratio of the design D as optimally as possible and in a case where the design D is to be inscribed in the circumscribed rectangle Br, the design D may be inscribed in at least two sides of the circumscribed rectangle Br.

Incidentally, threshold values and so forth on the basis of which to what extent the aspect ratio is allowed to be changed is defined may be set in advance for every design D. In this case, the print data generation section 314 may scale up/down the design D so as to be inscribed in as many sides of the circumscribed rectangle Br as possible in an allowable range with reference to supplementary information concerned.

Figure 5B:
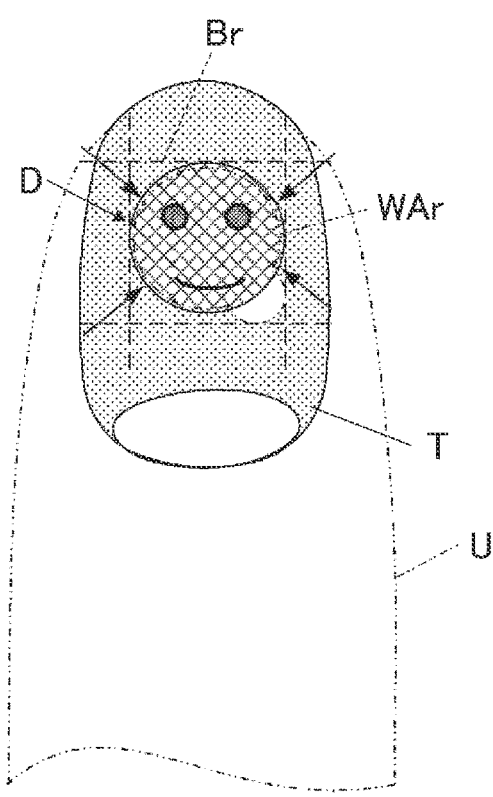
FIG. 5B is a diagram illustrating one example of a state where design fitting and scanning are about to be performed.
Figure 5D:
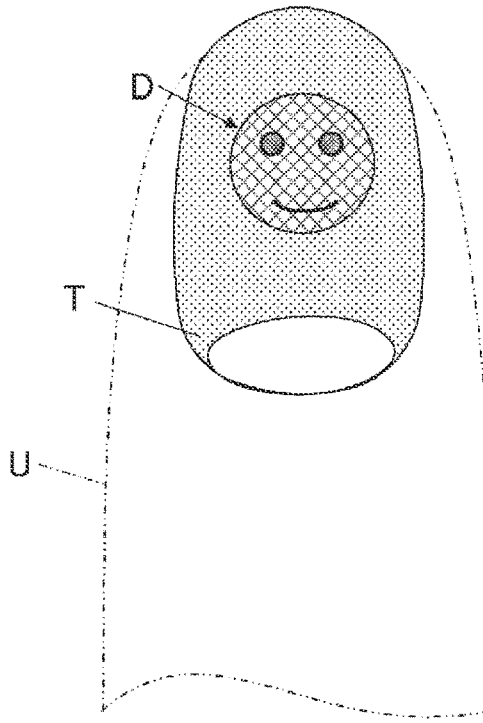
FIG. 5D is a diagram illustrating one example of a state where fitting of the design into the base coated region of the nail is completed.

FIG. 5B illustrates one example of a state where the design D is adjusted so as to have the size with which the design D is inscribed in the circumscribed rectangle Br which is set around the base coated region WAr and is fitted into the base coated region WAr. In FIG. 5B, the base coated region WAr is indicated by a two-point chain line and the circumscribed rectangle Br is indicated by a broken line. In the example in FIG. 5B, the design D is inscribed in left, right and upper sides of the circumscribed rectangle Br.

As illustrated in FIG. 5B, the design D partially (a part of an outer circumferential edge of the design D) bulges outward beyond the base coated region WAr. In addition, apart (a lower right bulging-out and base-coated part) of the base coated region WAr does not overlap with the design D.

As described above, in the design D, the part which does not overlap with the base coated region WAr is inferior in ink fixability and color developability and is not beautifully reproduced when printed. Accordingly, it is preferable that the design D be printed so as to overlap with the base coated region WAr as widely as possible in order to "make it possible to print the desired design D without being spoiled".

Here, as an index which indicates "to what extent the design D is spoiled", a "deficiency rate" is taken into consideration in the present embodiment. The "deficiency rate" is a value the calculation of which is possible by using a formula "the area of the design D which does not overlap with the base coated region WAr÷the total area of the design D". The deficiency ratio which is obtained in a case where the entire of the design D "does not overlap with the base coated region WAr" is 100%. On the other hand, the deficiency ratio which is obtained in a case where the entire of the design D "overlaps with the base coated region WAr" (that is, the entire of the design D is superposed on the base coated region WAr) is 0%.

In the present embodiment, the print data generation section 314 performs fitting (for example, scaling-down) of the nail design (the design D) and scanning of the inside of the nail region (step S7) and searches out the region in which "it is possible to print the desired design D without being spoiled". Incidentally, in FIG. 5B and so forth, scanning is indicated by a dotted line. In the present embodiment, the entire of the nail region is scanned pixel by pixel starting from an end so as to see whether the design D and the base coated region WAr mutually overlap. Incidentally, away of scanning and a range to be scanned are not limited to those which are exemplified in the drawings.

Incidentally, in order to scan the inside of the nail region, it is necessary to detect the nail region in a state of distinguishing the nail region from surrounding skin and so forth. However, in the present embodiment, it is sufficient that the print data generation section 314 be capable of searching a range that the design D is to be printed and be capable of defining a scanning range. Accordingly, the nail region may not be detected precisely to such an extent that even an end thereof is detected.

Incidentally, although it is preferable that the deficiency rate be 0%, in a case where the nail design is fitted (for example, scaled down) such that the deficiency rate is reduced to 0%, there are cases where the size of the design D becomes smaller than the size that the user imagines and fitting (scaling-down) of the design D becomes rather unpreferable.

Accordingly, in the present embodiment, a threshold value (a predetermined value) of an allowable deficiency rate is defined in advance and in a case where the deficiency rate is less than this predetermined value (for example, the deficiency rate: 1%), a region concerned is defined as the design printing region in which the design D is to be printed.

Incidentally, for example, there is one case where in one design D and so forth that a characteristic pattern is present on a peripheral edge of the design and therefor when there exists a part that the design D is not printed on one end thereof, that part stands out, even when the deficiency rate is low, presence of that part greatly affects finish, and there is another case where, in another design D and so forth that a peripheral edge thereof becomes blurred in gradation, even when a part which is not partially printed is present on one end thereof and so forth, presence of that part does not greatly affect the finish. It is thought that the allowable deficiency rate is different depending on the kind and so forth of each design D. Therefore, the threshold value (the predetermined value) of the allowable deficiency rate may be set in advance for every design D.

The print data generation section 314 performs fitting (for example, scaling-down) of the design D concerned and scanning of the inside of the nail region and then appropriately decides whether the deficiency rate of the nail design (the design D) is less than the predetermined value (that is, whether the area of the design D which does not overlap with the base coated region WAr is less than a predetermined value) and a location that the deficiency rate is less than the predetermined value (step S8).

In a case where the deficiency rate of the design D is not less than the predetermined value (for example, in a case where the deficiency rate of the design D is 10% and so forth when the predetermined value of the allowable deficiency rate is less than 1%, step S8: NO), the process returns to step S7 and the fitting (the scaling-down of the design D) and the scanning of the inside of the nail region are performed again.

On the other hand, in a case where the deficiency rate of the design D is less than the predetermined value (for example, in a case where the deficiency rate of the design D is 1% and so forth when the predetermined value of the allowable deficiency rate is less than 1%, step S8: YES), the print data generation section 314 sets the design printing region (the design printing region WAr1 in FIG. 5C) in which the nail design is to be printed in conformity to the position and the size of the nail design (the design D) which becomes less than the determined value in the deficiency rate (step S9).

In addition, the print data generation section 314 sets a region which does not overlap with the design printing region WAr1 in which the nail design (the design D) is to be printed in the base coated region WAr as the nail color coating region (the nail color coating region WAr2 in FIG. 5C) which is to be coated with the nail color which is based on the color information on the nail T (step S10).

In a case where the design printing region WAr1 and the nail color coating region WAr2 are decided, the print data generation section 314 generates the print data on the basis of which the nail design (the design D) is printed in the design printing region WAr1 and the nail color coating region WAr2 is coated (printed) with the nail color and outputs the print data to the print unit 40 (step S11).

Then, printing is performed by the print unit 40 on the basis of the print data (step S12).

Thereby, the design D which is close to one design D that the user selects in impression is printed on the nail T and the bulging-out part of the base is coated (printed) with the nail color and thereby the bulging-out part becomes inconspicuous.

Incidentally, although the case where the part is coated with the base in a state of bulging out from the range of the region which is to be originally coated with the base is described above with reference to FIG. 5A to FIG. 5D, for example, as illustrated in FIG. 6A to FIG. 6D, also in a case where a part which is to be originally coated with the base is left uncoated with the base, the print processing is performed similarly.

Figure 6A:
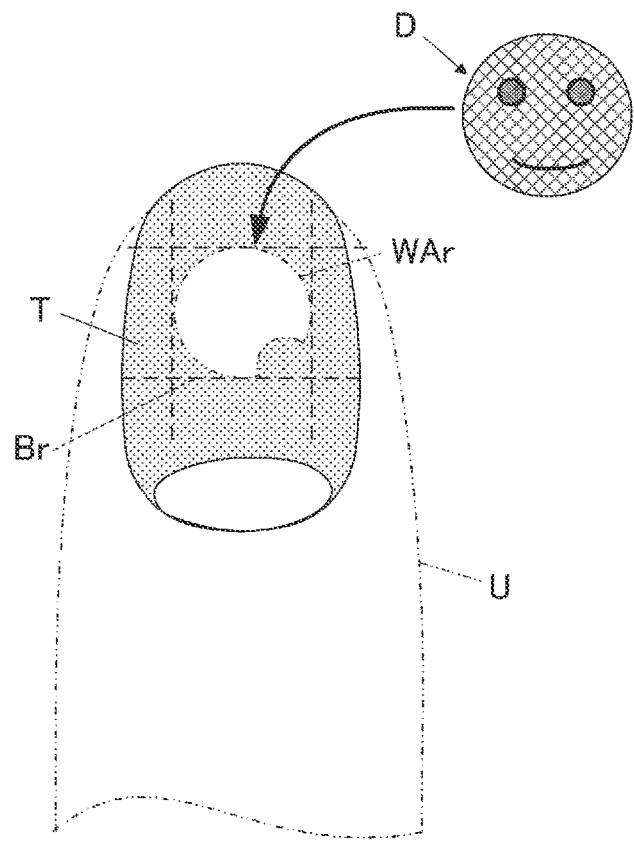
FIG. 6A is a diagram illustrating one example of a state where the design is about to be fitted into a circumscribed rectangle which is set around another base coated region.

That is, as illustrated in FIG. 6A, in a case where the desired nail design (the design D) is the almost circular design D and, then there exists the part which is left uncoated with the base on the nail T and, therefore, the lower right part of another base coated region WAr is partially missing, when the circumscribed rectangle Br which is circumscribed to the base coated region WAr is set (see step S5 in FIG. 3) and the design D is arranged in the circumscribed rectangle Br, the ink fixability and the color developability are reduced on the lower right part of the design D which overlaps with the part which is left uncoated with the base.

Figure 6C:
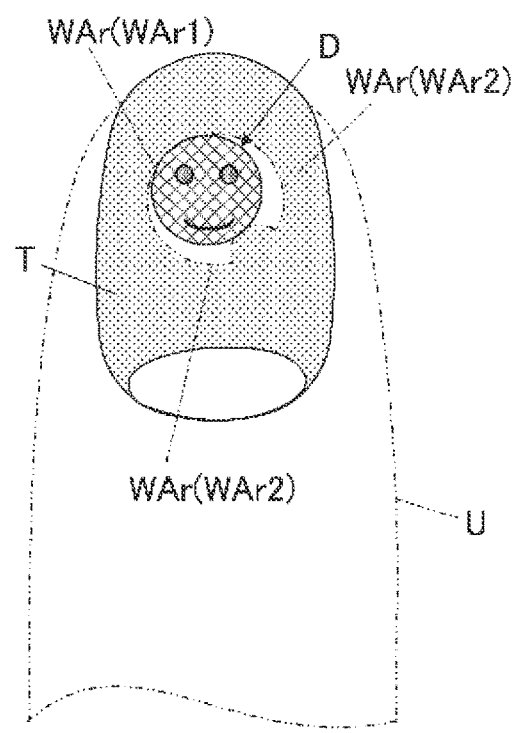
FIG. 6C is a diagram illustrating one example of a state where the design fitting and the scanning are being performed.
Figure 6B:
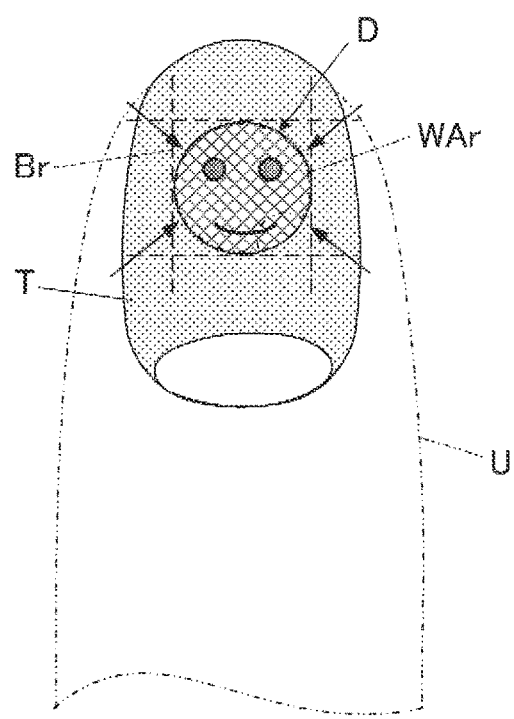
FIG. 6B is a diagram illustrating one example of a state where design fitting and scanning are about to be performed.

Accordingly, as illustrated in FIG. 6B, the print data generation section 314 performs the fitting (for example, the scaling-down) of the nail design (the design D) and scans the inside of the nail region as indicated by a dotted line in FIG. 6B (see step S7 in FIG. 3).

Then, when the deficiency rate of the design D becomes less than the predetermined value, the print data generation section 314 sets the design printing region WAr1 so as to print the design D on a position where the design printing region WAr1 is set and with a size which is commensurate with the size of the design printing region WAr1. In a case where the design D is scaled down to the size with which the design D does not overlap with the part which is left uncoated with the base (that is, the size of the design D is adjusted such that the design D entirely fits in the base coated region WAr), for example, as illustrated in FIG. 6C, the deficiency rate of the design D is reduced to 0%. On the other hand, as illustrated in FIG. 6C, a region which does not overlap with the design printing region WAr1 is generated in the base coated region WAr by the amount that the design D is scaled down. The print data generation section 314 sets this region as the nail color coating region WAr2. Then, the print data generation section 314 generates the print data so as to print the design D in the design printing region WAr1 and to coat (print) the nail color coating region WAr2 with the nail color.

Figure 6D:
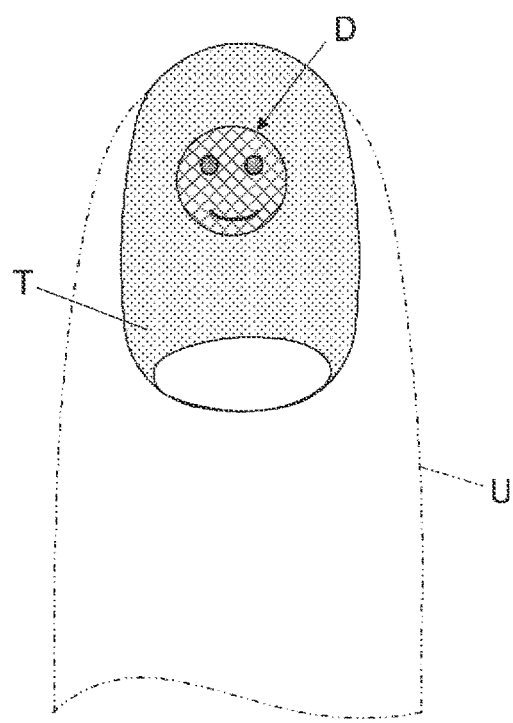
FIG. 6D is a diagram illustrating one example of a state where fitting of the design into the base coated region of the nail is completed.

Although the size of the design D becomes slightly small as illustrated in FIG. 6D by performing the printing in accordance with the print data which is generated in this way, it becomes possible to finish the nail printing almost as imagined.

Incidentally, the way to be adopted in a case where the print data generation section 314 fits the nail deign (the design D) into the base coated region WAr is not limited to the scaling-down of the design D.

Figure 7A:
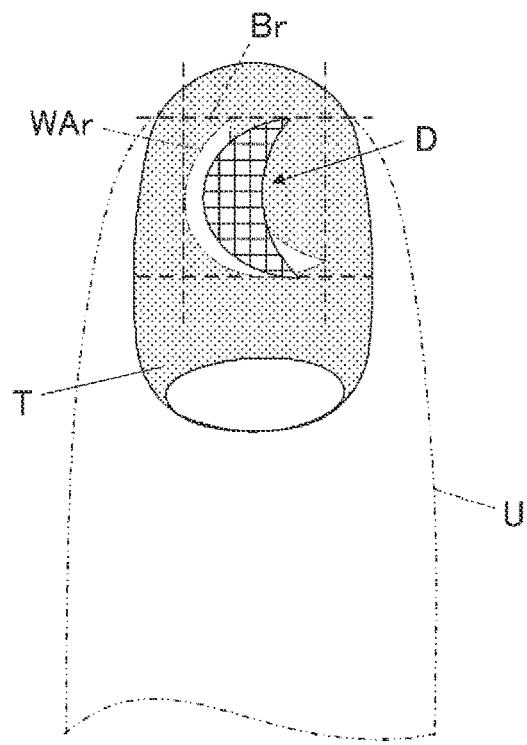
FIG. 7A is a diagram illustrating one example of a state where another design is arranged in the circumscribed rectangle.
Figure 7C:
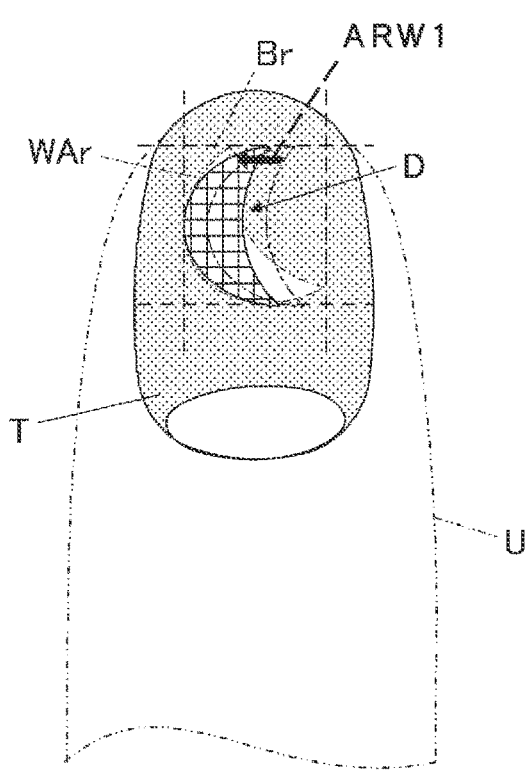
FIG. 7C is a diagram illustrating one example of a state where the design is moved in the circumscribed rectangle.
Figure 7B:
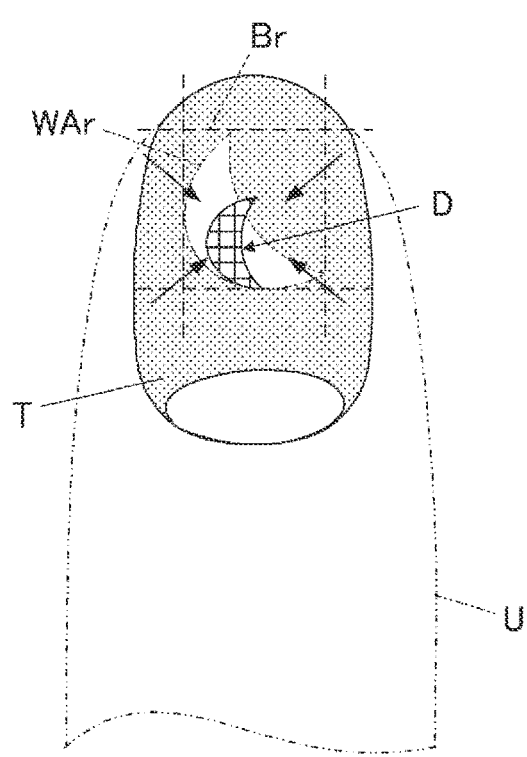
FIG. 7B is a diagram illustrating one example of a state where the size of the design is scaled down conforming with the size of the circumscribed rectangle which is set around the base coated region.
Figure 7D:
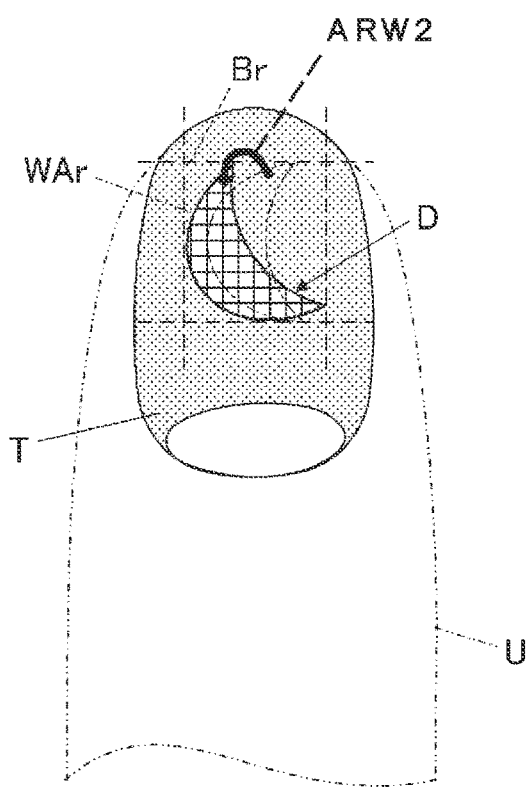
FIG. 7D is a diagram illustrating one example of a state where the design is rotated in the circumscribed rectangle.

For example, as illustrated in FIG. 7A, in a case where a crescent-shaped nail design (a design D) is to be fitted into further another base coated region WAr, when trying to fit the design D into the base coated region WAr by scaling down the design D such that the entire design D is almost held in the base coated region WAr, the size of the design D which is to be printed becomes smaller than the original size of the design D that the user imagined at the time point that the user selected the nail design (the design D) as illustrated in FIG. 7B. On the other hand, as indicated by an arrow ARW1 in FIG. 7C, in a case where the nail design (the design D) is laterally moved leftward so as to bring the nail design (the design D) into alignment with the base coated region WAr, the deficiency rate of the design D becomes lower than the deficiency rate which is obtained in an initial state which is illustrated in FIG. 7A with no need of changing the size of the design D. In addition, as indicated by an arrow ARW2 in FIG. 7D, in a case where the nail design (the design D) is rotated (inclined) counterclockwise, the deficiency rate of the design D becomes considerably lower than the deficiency rate which is obtained in the initial state which is illustrated in FIG. 7A with no need of changing the size of the design D and the deficiency rate becomes almost 0% in the example illustrated in FIG. 7D.

There are cases where when the nail design is moved or rotated, a finished impression thereof is considerably changed from its initial impression depending of the kind of the nail design (the design D). On the other hand, there are also cases where there is no large difference in the entire impression of the design D between the initial state and the finished state, for example, as illustrated in the examples in FIG. 7A and FIG. 7C and in FIG. 7A and FIG. 7D.

Accordingly, it is preferable to decide, in advance, the threshold value on the basis of which the relocation (the left-right-direction and up-down-direction movements in the nail T, rotation direction and angle changing) is made allowable for every nail design (the design D) and to perform adjustment by using a way which makes changing from the initial state as little as possible while referring to the threshold value in a case where the print data generation section 314 fits the nail design (the design D) into the base coated region WAr.

Incidentally, elements which are regarded to be important in a case where the print data generation section 314 fits the nail design (the design D) into the base coated region WAr may be respectively prioritized and weighted for every design D.

In this case, the print data generation section 314 fits the nail design (the design D) into the base coated region WAr on the basis of allowable scaling up or down rate and angle of rotation, a priority order and so forth which are set in advance such that, for example, scaling-up and scaling-down of the size of the design D are allowed up to certain percentages, and in a case where it is possible to cope with a situation in a range of the certain percentages, only the size of the design D is scaled up/down thereby to cope with the situation, in a case where the deficiency rate of the design D does not become less than the predetermined value unless the design D is scaled up/down exceeding the certain percentages, movement in the right direction is allowed up to a certain percentage, and in a case where it is still impossible to cope with the situation even when the movement in the right direction is allowed up to the certain percentage, clockwise rotation up to a certain degree is allowed and so forth.

In addition, in a case where the print data generation section 314 fits the nail design (the design D) into the base coated region WAr, the design D may be scaled up/down and arrangement of the design D may be adjusted by combining together the plurality of elements in such a manner that, for example, the size of the design D is scaled down while rotating the design D clockwise within a range of the certain degree.

In addition, the design printing region WAr1 may not be necessarily held in the circumscribed rectangle Br of the base coated region WAr.

In a case where the deficiency rate of the design D is 0%, the design printing region WAr1 is typically set in the base coated region WAr and is held in the circumscribed rectangle Br. However, in a case where the scaling-up/down, the rotation and/or the movement of the design D is/are allowed when the deficiency rate of the design D is less than the predetermined value, there may be cases where a state where the design printing region WAr1 is set partially bulging out to the outside of the circumscribed rectangle Br meets a condition that the deficiency rate of the design D becomes less than the predetermined value as a result of scanning of the entire nail region.

In this case, it becomes possible for the print data generation section 314 to set the design printing region WAr1 even on the outside of the circumscribed rectangle Br.

Incidentally, in a case where the print data generation section 314 sets the design printing region WAr1 by performing scaling-up/down and adjustment of arrangement of the design D and thereby fitting the nail design (the design D) into the base coated region WAr as described above, there is a possibility that the size and the arrangement (for example, the inclination and the position) of the design D which is actually printed on the nail T may become different from the size and the arrangement of the design D that the user initially imagined.

Accordingly, for example, in a case where degrees of the scaling-up/down of the design D and the adjustment of arrangement of the design D are high to some extents, a conceptional drawing at completion which is obtained in a case where the design D is printed in the design printing region WAr1 which is set by the print data generation section 314 and the nail color coating region WAr2 which is also set by the print data generation section 314 is coated (printed) with the nail color may be displayed on the display unit 72 and so forth of the terminal apparatus 7 before the design D is actually printed so as to seek confirmation of the user.

On this occasion, in a case where the user inputs such a correction instruction that "Please print the design D largely even if the design D is more inclined" and so forth from the operation unit 71 and/or the user performs fine adjustment on the design D on the touch panel (manually), changing of the scaling-up/down of the design D and the arrangement of the design D of levels which exceeds the various threshold values and so forth which are set in advance for the design D may be made possible. In addition, in a case where such an instruction as above and so forth are input, the various threshold values and so forth which are set, in advance, for the design D may be rewritten, updated and stored into the design storage area 822 and so forth of the storage unit 82 and the processing may be performed by applying the updated threshold values from next time.

It becomes possible to realize the nail print of the design which is closer to the design that the user imagines by recognizing the confirmation and modification that the user makes.

In addition, in a case where the deficiency rate of the design D does not become less than the predetermined value by adjustment which is performed within the range of the threshold values which are set in advance for every design D because of many parts or wide area which are/is left uncoated with the base and other reasons, an inquiry screen, a message screen and so forth for informing the user of such a situation as mentioned above may be displayed on the display unit 72 and so forth of the terminal apparatus 7 so as to seek confirmation and response of the user.

In this case, for example, a screen and so forth that the design D is superimposed on the current base coated region WAr may be displayed so as to show a range to be additionally coated with the base.

As described above, according to the present embodiment, the printing apparatus 1 includes the control unit 31 which captures the nail image by making the photograph device 50 photograph the image of the nail T which is a state of being coated with the base, detects the color information on the nail T and the base coated region WAr which is coated with the base from the nail image, and generates the print data by setting the region in which it is possible to print the desired design D without being spoiled in the relation with the base coated region WAr as the design printing region WAr1 in which the design D is to be printed and setting the region which does not overlap with the design printing region WAr1 in the base coated region WAr as the nail color coating region WAr2 which is to be coated with the nail color which is based on the color information on the nail T, and the print unit 40 which performs printing on the nail T in accordance with the print data.

Thereby, even in a case where the region is not coated with the base correctly over a range which is set in accordance with the shape and so forth of the design D, it is possible to print the desired design D on the region.

In a case where the printing range is not the entire of the nail T, in particular, as in a case of printing a one-point design and a French nail which is created by performing printing only on a nail tip portion, it is difficult to accurately coat a target region with the base over a range which is set in accordance with the shape and so forth of the design D. According to the present embodiment, also in such a case as described above, it becomes possible to print the design D which is close to the design that the user initially imagined at selection of the design on the nail T without taking much time and labor for recoating the region with the base.

In addition, in a case where a part is coated with the base in a state of bulging outward from the range of the region which is to be originally coated with the base, when the color of the base remains as it is, the color of the base stands out and final nail printing is not beautifully finished. In this respect, in the present embodiment, since, in the base coated region WAr, the region in which the design D is not printed is coated with the color which is close to the color of the nail T, the color of the base does not stand out and it becomes possible to realize beautiful finish as a whole.

In addition, in the present embodiment, in a case where the value which is obtained by dividing the area of the design D which does not overlap with the base coated region WAr by the total area of the design D is defined as the deficiency rate of the design D, the print data generation section 314 of the control unit 31 sets the design printing region WAr1 by fitting the deign D into the base coated region WAr such that the deficiency rate becomes less than the predetermined value.

Even if printing is performed on the region which is not coated with the base, the ink fixability and color developability are low and the beautiful finish is not obtained.

On this point, in a case of setting the design printing region WAr1 in which the design D is to be printed, it becomes possible to realize beautifully finished nail printing by considering such that the deficiency rate of the design D becomes less than the predetermined value as in the present embodiment.

The print data generation section 314 of the control unit 31 may set the design printing region WAr1 by fitting the design D into the base coated region WAr in such a manner that the deficiency rate is reduced to 0%.

In this case, since the entire of the design D is completely arranged in the base coated region WAr, it becomes possible to perform nail printing which is beautifully finished down to the end of the design D.

In addition, in the present embodiment, the print data generation section 314 of the control unit 31 sets the design printing region WAr1 by setting the circumscribed rectangle Br which is circumscribed to the base coated region WAr, scaling up/down the design D to the size with which the design D is inscribed in at least two sides of the circumscribed rectangle Br and adjusting at least either the arrangement or the size of the design D until the area of the design D which does not overlap with the base coated region WAr becomes less than the predetermined value.

It becomes possible to appropriately and efficiently set the design printing region WAr1 by setting an initial position to be saved in a case where the design D is arranged on the nail T in the circumscribed rectangle Br of the base coated region WAr in this way.

In addition, in the present embodiment, the nail region which is the region of the entire nail T is detected from the nail image, the print data generation section 314 of the control unit 31 searches out the region where it is possible to print the design D without being spoiled in the relation with the base coated region WAr from within the nail region and sets the searched-out region as the design printing region WAr1.

Since the region in which it is possible to print the design D without being spoiled is searched out by scanning the entire of the nail region in this way, it is possible to set, for example, even a region which partially deviates from the circumscribed rectangle Br of the base coated region WAr as the design printing region WAr1 as long as that region is a region in which the deficiency rate of the design D becomes less than the predetermined value and it becomes possible to flexibly set an appropriate region as the design printing region WAr1.

Accordingly, even in a case where the region is coated with the base in an awkward shape and it is impossible to set the circumscribed rectangle Br of the base coated region WAr at an appropriate position and with an appropriate size, it is possible to cope with this situation.

In addition, in the present embodiment, the print data generation section 314 of the control unit 31 sets the nail color with which the nail color coating region WAr2 is to be coated on the basis of the color information on the nail T which is located in the vicinity of the nail color coating region WAr2.

Accordingly, it becomes possible to finish the bulging-out part of the base in a natural state where the color of the bulging-out part more blends into the color of its surrounding.

Incidentally, although the embodiment of the present disclosure is described above, it goes without saying that the present disclosure is not limited to the above-described embodiment and it is possible to modify the present disclosure in a variety of ways within a range not deviating from the gist of the present disclosure.

For example, in the present embodiment, a case where the print data generation section 314 of the control unit 31 searches out the region in which it is possible to print the design D without being spoiled in the relation with the base coated region WAr by scanning the entire of the nail region is exemplified. However, the range that the print data generation section 314 scans is not limited to the entire of the nail region.

For example, only an inner region of the circumscribed rectangle Br of the base coated region WAr may be scanned.

A difference in color is small between the nail region and the skin and so forth of its surrounding and therefore it is difficult to accurately detect the nail region. In contrast to the nail region, since the base coated region WAr is coated white and so forth, that is, the color which is definitely distinguishable from the colors of the nail T and so forth, it is possible to comparatively readily and accurately detect the nail region.

In addition, in general, it is supposed that the region in which the design D is to be originally printed and a region which is located in the vicinity thereof are coated with the base, and, in many cases, it is sufficient that only the inner region of the circumscribed rectangle Br of the base coated region WAr be set as a range to be searched, and it is thought rare that it is preferable to set the design printing region Br to the outside of the circumscribed rectangle Br of the base coated region WAr.

Further, it is possible to reduce a range over which the print data generation section 314 scans by setting only the inner region of the circumscribed rectangle Br as the range to be searched and thereby it becomes possible to perform searching efficiently and rapidly.

In addition, in this case, it is not essential to acquire the information on the region in which the design D is not printed and therefore the nail region may not be detected.

In addition, in the present embodiment, the deficiency rate of the design D is obtained as the index which is used in a case of searching out the region in which it is possible to print the desired design D without being spoiled in the relation with the base coated region WAr. However, it is not essential to obtain the deficiency rate of the design D. The region in which the design D is to be printed may be searched out on the basis of another index as long as it is possible to set the design printing region WAr1 in such a manner that the region in which the design D is to be printed is arranged in the base coated region WAr to the greatest possible extent (in such a manner that the design D is not printed in a state of bulging outward beyond the base coated region WAr to the greatest possible extent).

For example, the design printing region WAr1 may be set by adjusting at least either the arrangement or the size of the design D until the area of the design D which does not overlap with the base coated region WAr becomes less than the predetermined value.

In addition, it is not essential to set the circumscribed rectangle Br which is circumscribed to the base coated region WAr and to set a state where the design D is arranged in the inner region of the circumscribed rectangle Br as the initial state.

In a case where the nail region which is the region of the entire nail T is to be detected, the design printing region WAr1 may be defined by setting a state where the design D is arranged somewhere in the nail region as the initial state and by appropriately moving the position of the design D and scaling up/down the size of the design D such that the region in which the design D is to be printed is arranged in the base coated region WAr to the greatest possible extent.

In addition, in the present embodiment, although the description is made by exemplifying a case where the user manually coats the nail with the base, the present disclosure is not limited to the case where the nail is coated with the base manually. For example, the print unit 40 and so forth may include a base printing (coating) section and the nail may be automatically coated with the base by the base printing section.

In this case, the print head 41 may contain white ink and so forth to be used as the base so as to function as the base printing section. Incidentally, another print head which functions as the base printing section which ejects the ink to be used as the base may be installed independently of the print head 41 which is used for printing the design D.

In addition, although, in the present embodiment, the printing apparatus 1 is configured that the ink jet system print head 41 is included as the print head 41 thereof, the system of the print head 4 is not limited to the ink jet system.

In particular, in a case where the print unit 40 and so forth include the base printing section so as to perform base printing automatically, the base printing section may be of a system which is different from the system of the print head 41 for printing the design D.

In addition, in the present embodiment, although a case where the printing apparatus 1 performs the printing on the nail in cooperation with the terminal apparatus 7 is exemplified, the type of the printing apparatus 1 is not limited to the type which is introduced here and may be of a type which is configured to complete execution of the printing operation alone.

For example, in the present embodiment, although a case where inputting of the print start instruction, selection of the nail design (the design D) and so forth are performed from the operation unit 71 on the terminal apparatus 7 side is exemplified, the printing apparatus 1 may be also configured that inputting and so forth of various instructions are performed by the operation unit 12 on the printing apparatus 1 side. In this case, the printing apparatus 1 may include a touch panel system operation unit. In addition, the printing apparatus 1 may include a display unit and, in this case, a touch panel may be integrally disposed on the display unit.

In addition, in the present embodiment, although a case where the nail design storage area 822 for storing the data on the nail designs (the designs D) is installed in the storage unit 82 of the terminal apparatus 7 is exemplified, the data on the nail designs (the designs D) is not limitedly stored in the storage unit 82 of the terminal apparatus 7 and may be also stored in the storage unit 32 of the printing apparatus 1.

In addition, the printing apparatus 1 may be also configured in such a manner that the image data on the nail designs is stored in a server apparatus and so forth connection with which is possible via a network line and so forth so as to make it possible to refer to the data on the nail designs (the designs D) by gaining access to the server apparatus and so forth.

It becomes possible to select one design D to be printed from a larger number of the nail designs (the designs D) without increasing capacities of the storage unit 82 and so forth by configuring the printing apparatus 1 in this way.

Incidentally, in the present embodiment, although a case where the printing apparatus 1 is configured that the nail information detection section 313 and the print data generation section 314 are included in the printing apparatus 1 and the control device 30 of the printing apparatus 1 operates so as to detect the nail information from the nail image and to generate the print data is exemplified, the configuration of the printing apparatus 1 is not limited to the above configuration.

For example, the printing apparatus 1 may be also configured to include only the print device 40 and the photograph device 50 such that detection of the nail information and generation of the print data are performed by an external terminal (the terminal apparatus 7 such as, for example, a smartphone and so forth).

In this case, in a case where the nail T is photographed by the photograph unit 51 of the photograph device 50 and thereby the nail image (the image of the nail T which includes the finger U) is captured, the nail image which is captured by the photograph device 50 is sent to the control device 80 of the terminal apparatus 7 via the communication unit 13. In this case, the control device 80 of the terminal apparatus 7 functions as an image capturing device.

Then, the control device 80 on the terminal apparatus 7 side operates so as to detect the color information on the nail T, the base coated region WAr, the region information on the nail T (the coordinate information and so forth on the nail region) and so forth from the nail image. Then, the control device 80 operates so as to set the design printing region WAr1 in which the design D is to be printed and the nail color coating region WAr2 which is to be coated (printed) with the nail color on the basis of the detected information and to generate the print data so as to print the design D in the design printing region WAr1 and to coat (print) the nail color coating region WAr2 with the nail color. In this case, (a) corresponding program (s) is/are incorporated into the storage unit 82 and so forth on the terminal apparatus 7 side.

In a case where the print data is generated on the terminal apparatus side 7, the print data is transmitted to the printing apparatus 1 side and the printing which is based on the print data is performed.

Although one embodiment and several modified examples of the embodiment of the present disclosure are described above, the scope of the present disclosure is not limited to the above-mentioned embodiment and modified examples thereof and the scope of the invention which is described in the patent claims and the scope of equivalency thereof are embraced therein.

What is claimed is:

1. A printing apparatus comprising:
at least one processor which:
detects, from an image of a nail, a base coated region in which the nail is coated with a base,
sets a design printing region in which a design is to be printed on the nail, such that the design printing region overlaps part of the base coated region,
sets a part of the base coated region which does not overlap with the design printing region as a nail color coating region which is to be coated with a nail color,
sets, as a nail color, an average value of color information in a region which is located in the vicinity of the base coated region, and
generates print data for printing the design in the set design printing region and for coating the nail color coating region with the nail color; and
a print head which performs printing on the nail in accordance with the print data to print the design in the set design printing region and to coat the nail color coating region with the nail color,
wherein a result of division of an area of the design which does not overlap with the base coated region by a total area of the design is set as a deficiency rate of the design, and the processor sets the design printing region by fitting the design into the base coated region such that the deficiency rate becomes less than a predetermined value, and
wherein the printing apparatus is capable of printing a plurality of different designs, predetermined values of the deficiency rate are set individually for the plurality of different designs, and the processor sets the design printing region by fitting the design into the base coated region such that the deficiency rate becomes less than the predetermined value set for the design to be printed.

2. The printing apparatus according to claim 1, wherein the processor sets the design printing region by fitting the design into the base coated region such that the deficiency rate is reduced to 0%.

3. The printing apparatus according to claim 1, wherein the processor sets the design printing region by setting a circumscribed rectangle which is circumscribed to the base coated region, scaling the design up or down to a size with which the design is inscribed in at least two sides of the circumscribed rectangle and adjusting either arrangement or the size of the design until an area of the design which does not overlap with the base coated region becomes less than a predetermined value.

4. The printing apparatus according to claim 1, wherein the processor detects a region of the nail from the image of the nail, searches out a region in which the design can be printed overlapping part of the base coated region from within the nail region, and sets the searched-out region as the design printing region.

5. The printing apparatus according to claim 1, further comprising:
a camera which captures the nail image.

6. A printing method comprising:
detecting, from an image of a nail, a base coated region in which the nail is coated with a base;
setting a design printing region in which a design is to be printed on the nail, such that the design printing region overlaps part of the base coated region;
setting a part of the base coated region which does not overlap with the design printing region as a nail color coating region which is to be coated with a nail color;
setting, as a nail color, an average value of color information in a region which is located in the vicinity of the base coated region;
generating print data for printing the design in the set design printing region and for coating the nail color coating region with the nail color; and
performing printing on the nail in accordance with the print data to print the design in the set design printing region and to coat the nail color coating region with the nail color,
wherein a result of division of an area of the design which does not overlap with the base coated region by a total area of the design is set as a deficiency rate of the design, and the design printing region is set by fitting the design into the base coated region such that the deficiency rate becomes less than a predetermined value, and
wherein predetermined values of the deficiency rate are set individually for a plurality of different designs that can be printed, and the design printing region is set by fitting the design into the base coated region such that the deficiency rate becomes less than the predetermined value set for the design to be printed.

7. A non-transitory computer-readable recording medium recording a program for making a computer of a printing apparatus control the printing apparatus to perform functions comprising:
detecting, from an image of a nail, a base coated region in which the nail is coated with a base;
setting a design printing region in which a design which is to be printed on the nail such that the design printing region overlaps part of the base coated region;
setting a part of the base coated region which does not overlap with the design printing region as a nail color coating region which is to be coated with a nail color;
setting, as a nail color, an average value of color information in a region which is located in the vicinity of the base coated region; and
generating print data for printing the design in the set design printing region and for coating the nail color coating region with the nail color,
wherein a result of division of an area of the design which does not overlap with the base coated region by a total area of the design is set as a deficiency rate of the design, and the design printing region is set by fitting the design into the base coated region such that the deficiency rate becomes less than a predetermined value, and
wherein the printing apparatus is capable of printing a plurality of different designs, predetermined values of the deficiency rate are set individually for the plurality of different designs, and the design printing region is set by fitting the design into the base coated region such that the deficiency rate becomes less than the predetermined value set for the design to be printed.

* * * * *